United States Patent [19]

Flowers

[11] 4,434,919
[45] Mar. 6, 1984

[54] MULTIPLE-POSITION SPARE TIRE MOUNT

[75] Inventor: Allan L. Flowers, Del Mar, Calif.

[73] Assignee: Nissan Design International, Inc., La Jolla, Calif.

[21] Appl. No.: 422,708

[22] Filed: Sep. 24, 1982

[51] Int. Cl.³ .............................................. B62D 43/02
[52] U.S. Cl. ............................. 224/42.21; 224/42.24; 296/37.2; 414/463
[58] Field of Search ............... 224/42.35, 42.08, 42.24, 224/42.26, 42.28, 42.44, 42.33, 42.06, 42.12, 42.21, 42.24, 42.29, 42.23, 42.3; 296/37.2; 414/463, 465, 466

[56] References Cited

U.S. PATENT DOCUMENTS

| | | | |
|---|---|---|---|
| 1,472,983 | 11/1923 | Lawrence | 414/463 |
| 2,036,472 | 4/1936 | Grimshaw | 296/37.2 |
| 2,052,970 | 9/1936 | Erbeck | 224/42.21 X |
| 2,063,598 | 12/1936 | Franklin | 414/463 |
| 2,494,411 | 1/1950 | Simi | 414/465 |
| 3,753,520 | 8/1973 | Bodde | 224/42.06 |
| 3,990,618 | 11/1976 | Shattuck | 224/42.24 |
| 4,019,664 | 4/1977 | Weiler | 224/42.24 |
| 4,089,449 | 5/1978 | Bayne et al. | 224/42.24 |
| 4,212,417 | 7/1980 | Scott | 224/42.21 |

Primary Examiner—Allan N. Shoap
Assistant Examiner—Robert Petrik
Attorney, Agent, or Firm—Fulwider, Patton, Rieber, Lee & Utecht

[57] ABSTRACT

A tire mounting arrangement allows a spare tire to be stored either inside the rear portion of an automotive vehicle or outside the tailgate door thereof.

6 Claims, 9 Drawing Figures

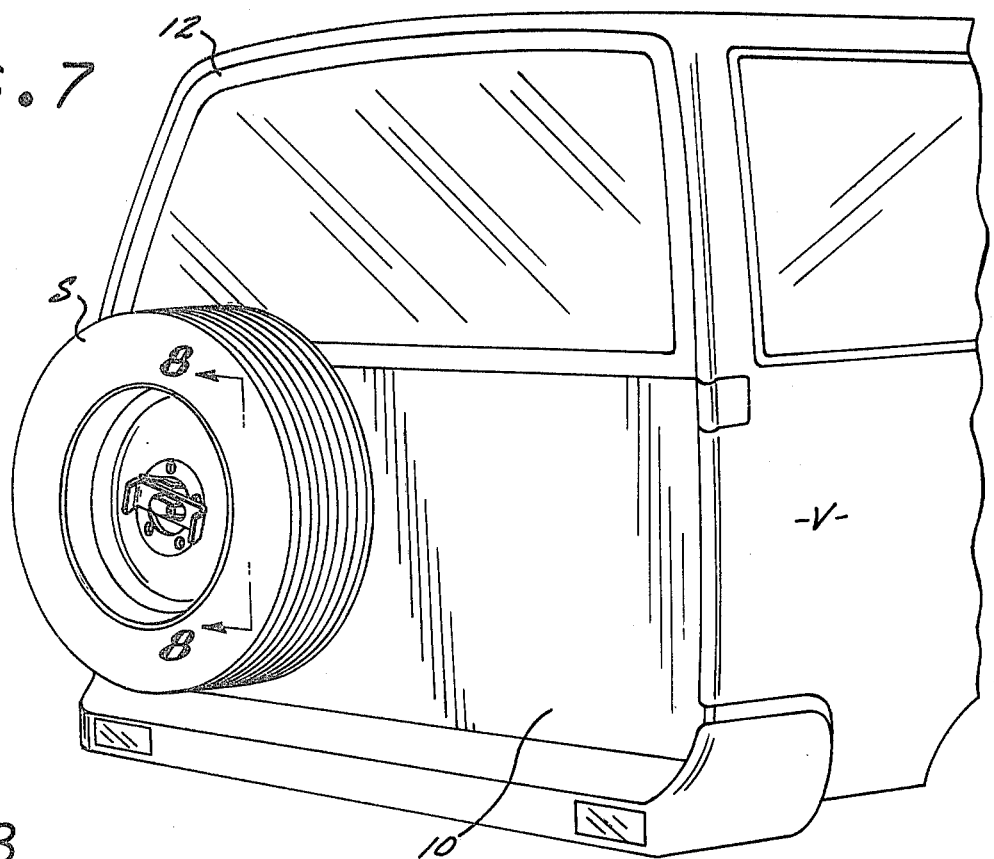
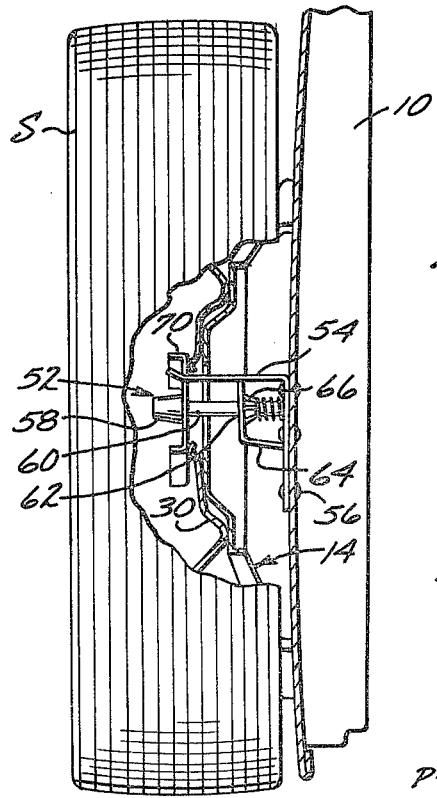
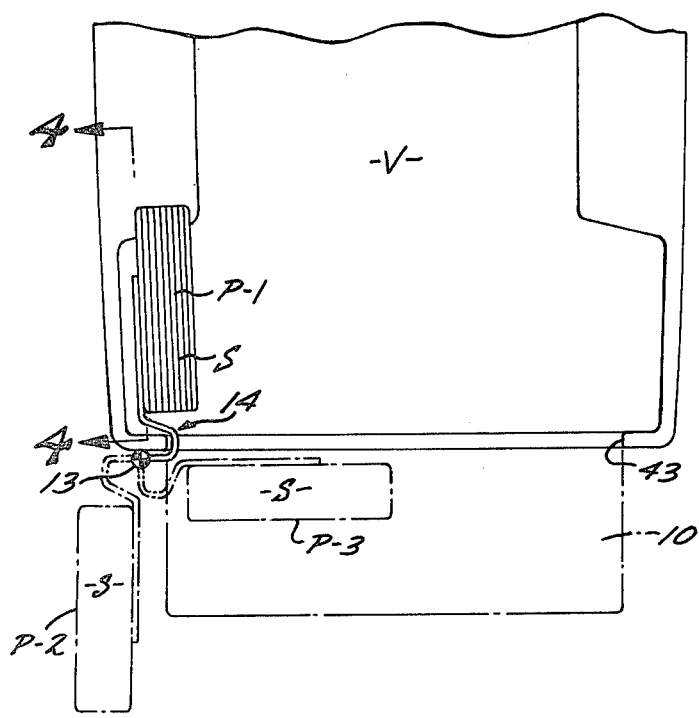

MULTIPLE-POSITION SPARE TIRE MOUNT

DESCRIPTION OF PRIOR ART

Automotive vehicles utilizing tailgate doors have become extremely popular with automobile owners throughout the world. Generally, the spare tire of such vehicles is stored either inside the rear portion of the vehicle or exteriorly thereof. Applicant is not aware of any spare tire mounting arrangement which permits the spare tire to be stored alternatively within the interior of the rear portion of the vehicle or outwardly of the tailgate door thereof. Applicant is aware of the spare tire mounting apparatus shown in U.S. Pat. Nos. 3,283,973; 3,371,832; 3,648,867; 3,753,520; and 3,845,891.

SUMMARY OF THE INVENTION

It is a major object of the present invention to provide a multiple-position spare tire mount which permits the spare tire to be mounted within the rear portion of a vehicle or alternatively outside the tailgate door thereof.

Another object of the present invention is to provide apparatus of the aforedescribed nature which allows the spare tire to be easily and quickly moved between its inside and outside positions.

Yet another object of the present invention is to provide apparatus of the aforedescribed nature which facilitates a tire-changing operation.

A more particular object of the present invention is to provide a tire mount of the aforedescribed nature which includes a tire support member secured to the rear portion of the vehicle to swing on a generally vertical axis from an inside-stored position, a tire-removing position exterior of the vehicle, and an outside-stored position outwardly and generally parallel to the closed tailgate door of such vehicle.

Another object of the present invention is to provide a multiple-position spare tire mount of the aforedescribed nature which is simple of design, foolproof in operation, and economical of construction.

These and other objects and advantages of the present invention will become apparent from the following detailed description when taken in conjunction with the appended drawings.

BRIEF DESCRIPTION OF THE DRAWINGS

FIG. 7 is a rear perspective view similar to FIGS. 1, 2, and 3, but showing the spare tire arranged in its outside-stored position;

FIG. 8 is a side view partially broken away in vertical sectional taken in enlarged scale along line 8—8 of FIG. 7 and showing a lock for retaining the tire support member in its outside-stored position; and FIG. 9 is a top view showing how the spare tire is moved between its various positions.

DETAILED DESCRIPTION OF A PREFERRED EMBODIMENT

Figure 3:
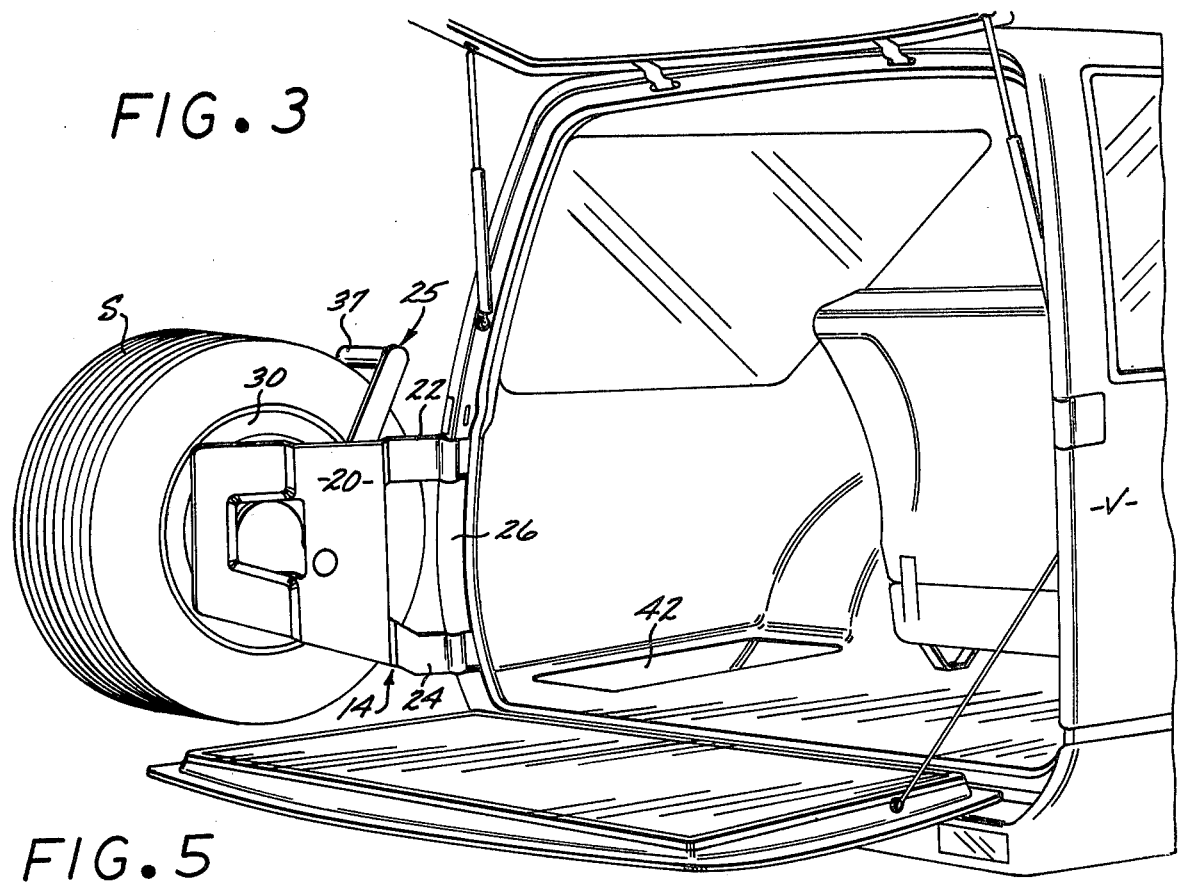
FIG. 3 is a rear perspective view similar to FIGS. 1 and 2, but showing the spare tire disposed in its tire-removing position exterior of the vehicle.

Referring to the drawings, there is shown an automotive vehicle V having a rear door, such as a conventional downwardly opening tailgate door 10, above which is arranged an upwardly opening rear window door 12. A spare tire S carried by a tire support member, generally designated 14, is movable between its inside-stored position of FIG. 1, its tire-removing position exterior of vehicle V of FIG. 3, and its outside-stored position outwardly and generally parallel to the closed tailgate 10 of the vehicle shown in FIG. 7. Generally, the spare tire S is stored in its inside position of FIG. 1. However, when additional room within the vehicle V is required, the tire may be arranged in its outside-stored position of FIG. 7. It should be noted that reference letter S includes both the spare tire and the wheel upon which it is carried.

Figure 4:
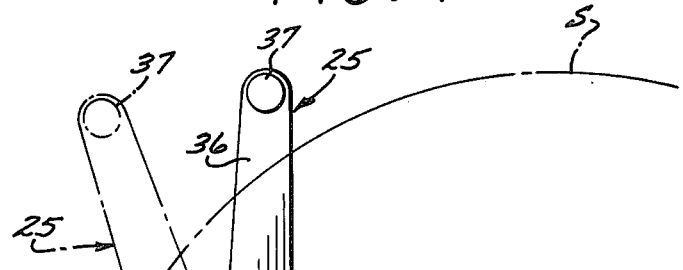
FIG. 4 is a sectional view taken in enlarged scale on line 4—4 of FIG. 9 of a tire support member forming part of said tire mount, with the spare tire being shown in phantom.

More particularly, tire support member 14 includes a vertical plate 20 formed with bifurcated upper and lower arms 22 and 24, hingedly connected to one side of door frame 26 for horizontal swinging movement about a generally vertical axis. The free end of plate 20 carries a generally L-shaped pivoting arm, generally designated 25, the free end of the horizontal leg 25a of which has an annular enlargement 27 formed with an aperture 28 that receives a bolt 29 which extends through one of the bolt holes of the hub of spare tire wheel 30 to engage a wing nut 32. Such bolt and nut removably secure the spare tire S to tire support 14. The intermediate portion of pivoting arm 25 is connected to plate 20 by horizontal pivot pin 34. The vertical leg of pivoting arm 25 defines a manually operable lever 36 provided with a handle 37 by means of which the pivoting arm is movable counter-clockwise between its normal position shown in solid outline in FIG. 4 and its tire-elevating position shown in phantom outline in that figure. Lever 36 is releasably maintained in either of its two positions by means of conventional spring-pressed detents 38 and 40, respectively, carried by plate 20.

It shold be understood that with the pivoting arm 25 disposed in its initial position, the spare tire S rests within the vehicle's interior tire well 42. In this manner, the spare tire S is anchored in its inside-stored position. Rearward counter-clockwise movement of the lever 36 serves to elevate the lower end of the spare tire S out of tire well 42 whereby it may be pivoted to the exterior of the vehicle and into its tire-removing position shown in FIG. 3 to one side of door opening 43. Such rearward counter-clockwise movement of lever 36 is effected by manual application of force to handle 37. Pivoting movement of tire support member 14 may be facilitated by continued application of manual force to such handle.

Figure 5:
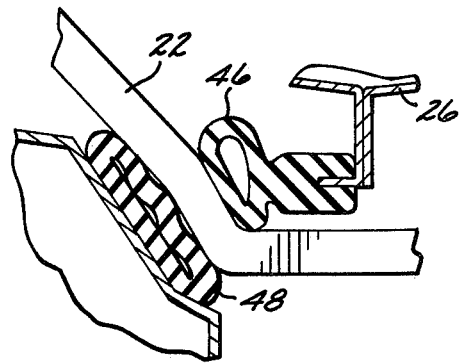
FIG. 5 is a broken horizontal sectional view taken in enlarged scale on line 5—5 of FIG. 1.
Figure 6:
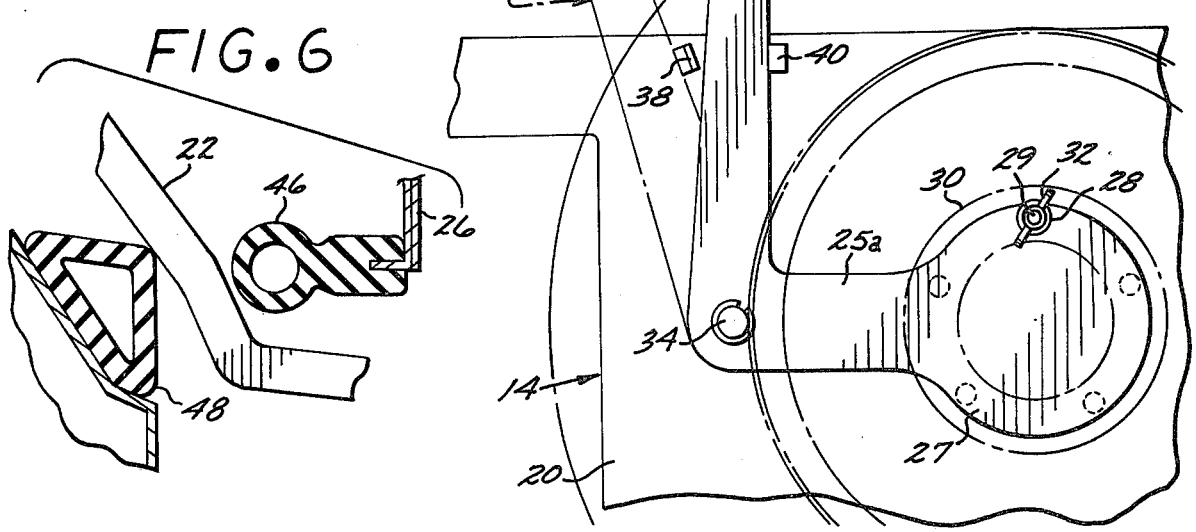
FIG. 6 is a horizontal sectional view similar to FIG. 5, but showing the parts thereof as they appear with the spare tire disposed in its tire-removing position.

Referring now to FIGS. 5 and 6, the frame 26 and portion of the tailgate 10 outwardly thereof is provided with resilient conventional double seals 46 and 48, respectively, which provide a water-tight seal between the tire support arms 22 and 24 and the interior of vehicle V when the spare tire S is disposed in its inside-stored position. FIG. 5 shows the position of these arms when tire support member 14 is disposed in its position of FIG. 7, while FIG. 6 shows this member in its position of FIG. 3.

Referring now to FIGS. 7 and 8, lock means, generally designated 52, are interposed between tire support member 14 and a rearwardly extending retainer 54 affixed to the rear surface of tailgate 10 by rivets 56 for releasably retaining the spare tire S in its outside-stored position of these figures. A suitable lock means may include key-operated mechanism 58, having a forwardly extending post 60 that extends through a bore 62 formed in a vertical web 64 of retainer 54. Post 60 is provided with dogs 66 normally spring-pressed outwardly as shown in FIG. 8 to secure post 60 to retainer 54. Key-operated mechanism 58 is operable to retract dogs 66 to thereby release the post from the retainer. An anchoring strip 70 is secured to the rear of post 60 to abut the hub of spare tire wheel 30 so as to temporarily secure tire support member 14, and hence spare tire S, in their positions of FIG. 8. When the key-operated mechanism 58 is operated to retract dogs 66 into an unlocked position, post 60 may be removed from retainer 54 to thereby free the tire support member, and hence spare tire S, from the outside-stored position of FIGS. 7 and 8. It should be understood that other forms of lock means may be provided without departing from the spirit of the present invention.

Figure 1:
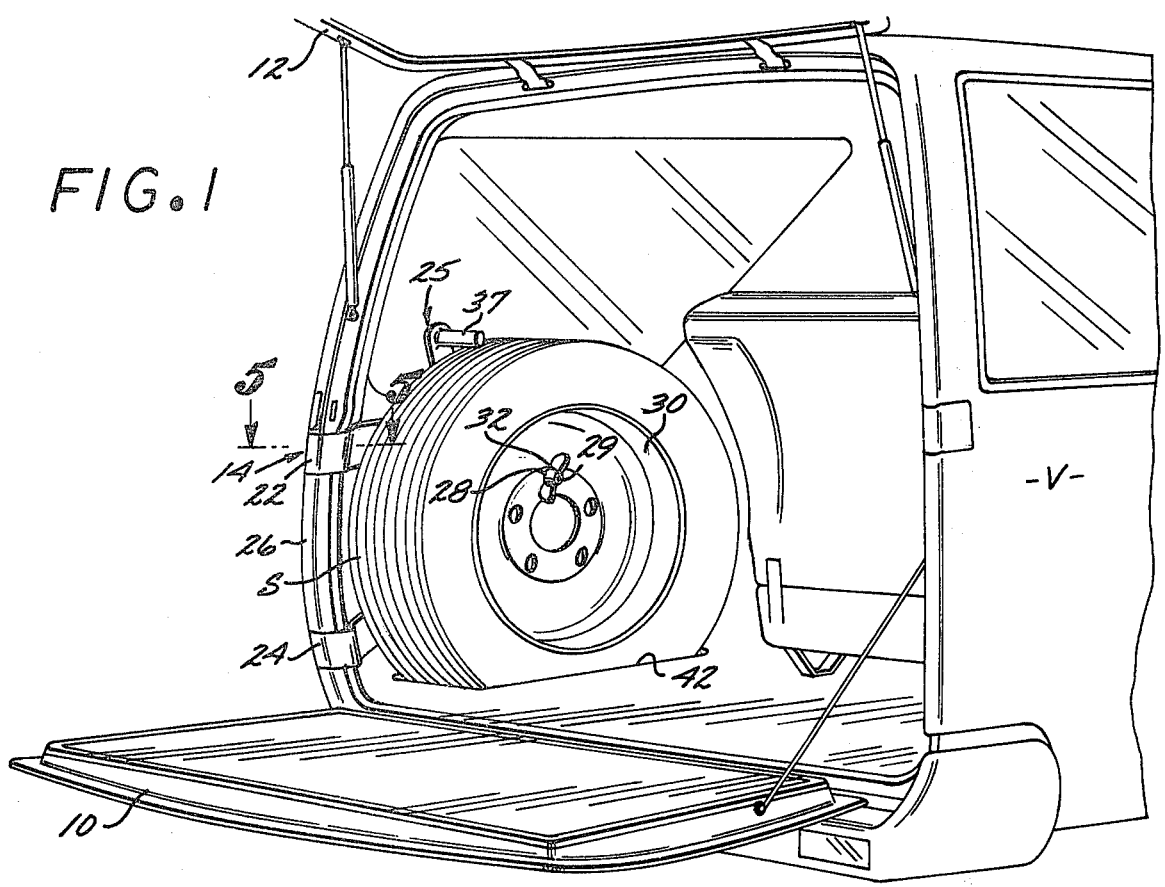
FIG. 1 is a rear perspective view of an automotive vehicle provided with a preferred form of multiple-position spare tire mount embodying the present invention and showing the spare tire in its inside-stored position.
Figure 2:
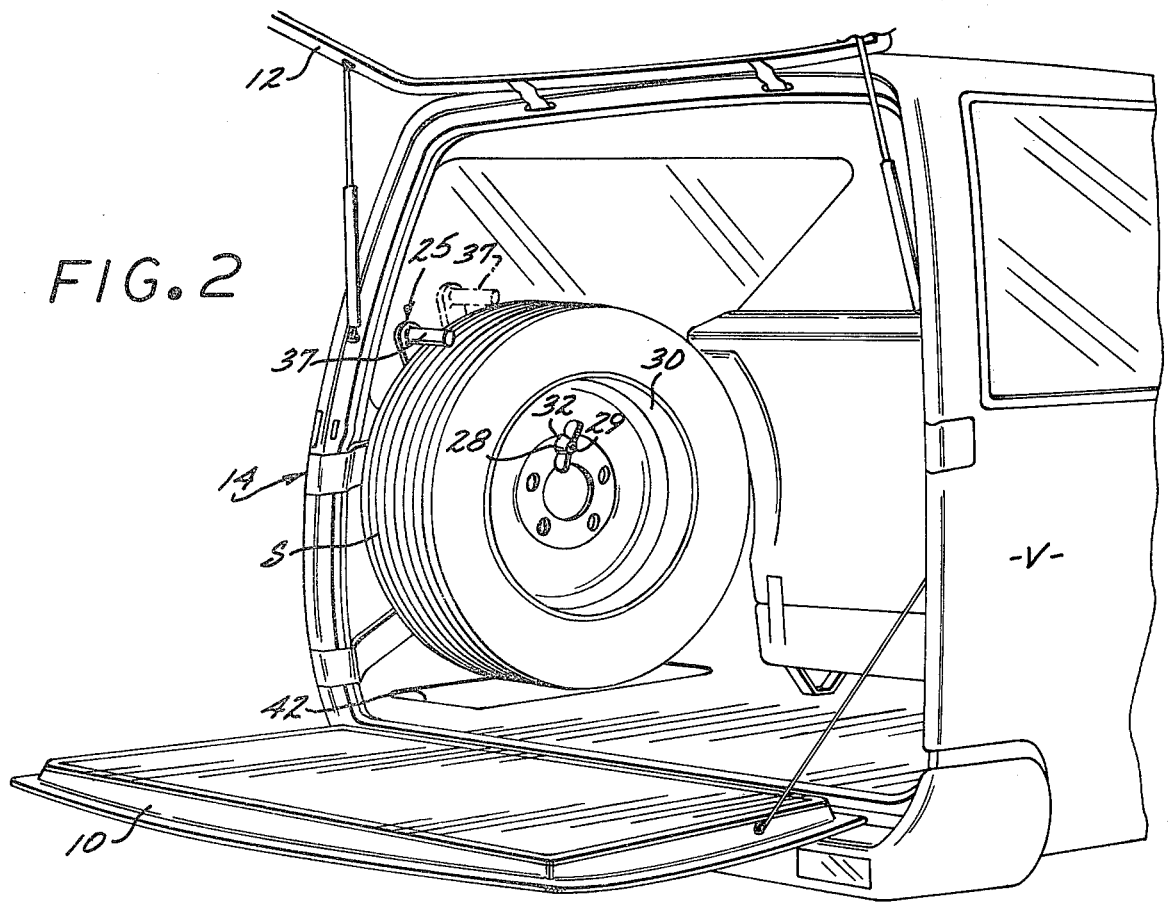
FIG. 2 is a rear perspective view similar to FIG. 1, but showing the spare tire raised from its inside-stored position.

In the use of the above-described tire mounting arrangement, spare tire S may be initially arranged in its inside-stored position of FIG. 1 wherein the lower portion thereof is disposed within tire well 42 so as to temporarily retain such tire in such position. When it is desired to remove the tire from its inside-stored position, handle 37 is grasped and manually pulled rearwardly from its dotted outline position of FIG. 2 to its solid outline position thereof. Such movement rotates pivoting arm 25 so as to raise spare tire S upwardly free of the confines of the tire well 42. The spare tire may then be swung outwardly of the interior of vehicle V in a clockwise direction as indicated in FIG. 9 from its inside-stored position P-1 to its tire-removing position exterior of the vehicle V and to one side of door opening 43. When disposed in such position, the spare tire S may be easily removed from its tire support 14 should it become desirable to change such spare tire. Alternatively, tailgate 10 may be moved into its raised position and rear window 12 lowered into its closed position and spare tire S may be swung into its outside-stored position P-3 of FIG. 9. Such movement of the spare tire is permitted by swinging of the tire support 14 about vertical axis 73 shown in FIG. 9. The spare tire will be releasably secured in its outside-stored position by the aforedescribed lock means 52. It will be apparent that movement of the spare tire between its various positions may be accomplished quickly and with a minimum expenditure of labor. It should be noted that the spare tire mount of the present invention may be utilized with vehicles having rear door configurations other than described hereinabove. By way of example, such tire mount could be used with a sidewardly opening tailgate.

Various changes and modifications may be made with respect to the foregoing detailed description without departing from the spirit of the present invention.

I claim:

1. In an automotive vehicle having a rear door, a multiple-position mount for a spare tire, comprising:
   a tire support member secured alongside one edge of the rear door frame to swing on a generally vertical axis from an inside-stored position generally parallel with a tire well, the tire well being of the type for holding a tire in its upright position parallel and adjacent to a sidewall of a vehicle and inside said vehicle, a tire-removing position exterior of the vehicle and to one side of the door opening, and an outside-stored position outwardly of the closed rear door and generally parallel thereto;
   anchoring means for retaining said tire in its inside-stored position; and
   lock means interposed between said tire support and said vehicle for retaining said tire in its outside-stored position whereby said tire may be selectively retained in either its inside-stored or outside-stored position.

2. In an automotive vehicle having a rear door and an interior tire well, the tire well being of the type for holding a tire in its upright position parallel and adjacent to a sidewall of a vehicle, a multiple-position mount for a spare tire, comprising:
   a tire support member secured alongside one edge of the rear door frame to swing on a generally vertical axis from an inside-stored position within said tire well, a tire-removing position exterior of the vehicle and to one side of the door opening, and an outside-stored position outwardly of the closed rear door and generally parallel thereto; and
   lock means interposed between said tire support and said vehicle for retaining said tire in its outside-stored position whereby said tire may be selectively retained in either its inside-stored position within said tire well or in its outside-stored position.

3. The combination of claim 1, wherein the rear door is provided with a retainer that is releasably engaged by said lock means.

4. The combination of claim 2, wherein the rear door is provided with a retainer that is releasably engaged by said lock means.

5. The combination of claim 2, wherein said tire support member includes a plate hinged alongside said edge of the rear door and a pivoting arm attached to said plate and carrying the tire, with pivoting movement of said pivoting arm raising the tire out of the tire well whereby the tire may be moved towards its tire-removing position.

6. The combination of claim 5, wherein the rear door is provided with a retainer that is releasably engaged by said lock means.

* * * * *